(12) United States Patent
Sawaguchi

(10) Patent No.: US 8,963,665 B2
(45) Date of Patent: Feb. 24, 2015

(54) HAPTIC SOLENOID

(71) Applicant: Tokyo Parts Industrial Co., Ltd., Gunma-ken (JP)

(72) Inventor: Takami Sawaguchi, Gunma-ken (JP)

(73) Assignee: Tokyo Parts Industrial Co., Ltd., Gunma-ken (JP)

( * ) Notice: Subject to any disclaimer, the term of this patent is extended or adjusted under 35 U.S.C. 154(b) by 0 days.

(21) Appl. No.: 14/041,233

(22) Filed: Sep. 30, 2013

(65) Prior Publication Data
US 2014/0132375 A1 May 15, 2014

(30) Foreign Application Priority Data

Nov. 14, 2012 (JP) .................................. 2012-249913
Jul. 29, 2013 (JP) .................................. 2013-156687

(51) Int. Cl.
*H01F 7/13* (2006.01)
*H02K 33/02* (2006.01)

(52) U.S. Cl.
CPC ..................................... *H02K 33/02* (2013.01)
USPC .......................................................... 335/274

(58) Field of Classification Search
USPC .......................................................... 335/274
See application file for complete search history.

(56) References Cited

U.S. PATENT DOCUMENTS 7,825,903 B2 * 11/2010 Anastas et al. ................. 345/173
8,072,317 B2 * 12/2011 Sproelich et al. ........... 340/407.2
8,264,465 B2 * 9/2012 Grant et al. .................... 345/173

FOREIGN PATENT DOCUMENTS

JP          2010-27613       2/2010

* cited by examiner

*Primary Examiner* — Shawki S Ismail
*Assistant Examiner* — Lisa Homza
(74) *Attorney, Agent, or Firm* — Jordan and Hamburg LLP

(57) ABSTRACT

A haptic solenoid comprises a base member, a fixed pole which is fixed in place on the base member and which has a coil. A mobile pole is arranged facing the fixed pole with a gap therebetween and which moves by way of being attracted to the fixed pole when power is supplied to the coil. Elastic members which are made from a metallic material and which bias the mobile pole in a direction that distances the mobile pole from the fixed pole when power is not supplied to the coil and guide mechanisms, which guide the movement of the mobile pole. The guide mechanisms are configured so as to guide the movement of the mobile pole so that the mobile pole can only move in a direction facing the fixed pole.

8 Claims, 5 Drawing Sheets

(a)

(b)

(c)

HAPTIC SOLENOID

BACKGROUND OF THE INVENTION

The present invention relates to a haptic solenoid that provides haptic feedback and is used, for example, in touch input devices.

A haptic solenoid is described, for example, in Japanese Patent Laid-Open Publication No. 2010-27613 which, as shown in FIG. 5, comprises a plastic frame 101 having a central open area; a fixed pole 102, which is fixed to a lower long leg 101A and an upper long leg 101B of the plastic frame 101; a mobile pole 103; and a coil 104, which is mounted on the fixed pole 102.

With this haptic solenoid, when the current to the coil is turned ON and OFF, the mobile pole 103 is attracted to and distanced from the fixed pole 102, which produces an elastic deformation in a side piece 101C between the lower long leg 101A and the upper long leg 101B, so as to vibrate a touchscreen frame (vibrated body) that is coupled to the upper long leg 101B, but which is not shown in the drawing.

In the haptic solenoid described above, the movement of the mobile pole 103 is controlled by way of the magnetic attraction of the fixed pole 102 and the elastic force of the side piece 101C, which is part of the plastic frame 101.

However, there is a tendency for the elastic modulus of the side piece 101C, which is made from plastic, to vary by a relatively large amount depending on the ambient temperature, and consequently there was a possibility of failing to achieve good haptic feedback because, depending on the ambient temperature, the prescribed level of vibration was not achieved.

Furthermore, because the fixed pole 102 and the mobile pole 103 were supported by the hollow plastic frame, with which the elastically deformed side piece 101C was integrally united, due to torsion and the like in the side piece 101C, the direction of vibration was not stable, and consequently there was a possibility of failing to achieve good haptic feedback because the prescribed level of vibration was not achieved.

SUMMARY OF THE INVENTION

One or more embodiments of the present invention provide a haptic solenoid capable of solving the problems of the prior art described above. Hereafter, aspects of the present invention are described. Note that, in the aspects described below, the constituent elements used can be used in the most freely chosen combinations possible.

A first aspect of the present invention is a haptic solenoid used for providing vibration to a vibrated body comprising a base member; a fixed pole which is fixed in place on the base member and on which a coil is wound; a mobile pole which is arranged facing the fixed pole with a gap therebetween and which moves by way of being magnetically attracted to the fixed pole when power is supplied to the coil; an elastic member which biases the mobile pole in a direction that distances the mobile pole from the fixed pole when power is not supplied to the coil; and a guide mechanism which guides the movement of the mobile pole, wherein the elastic member is made from a metallic material, and the guide mechanism guides the movement of the mobile pole so that the mobile pole can only move in a direction facing the fixed pole.

In a second aspect of the present invention, the elastic member is made from a nonmagnetic metallic material.

In a third aspect of the present invention, the guide mechanism comprises a guiding part provided on the base member and a guided part which engages with the guiding part, and which is provided on the mobile pole.

In a fourth aspect of the present invention, the guided part is provided at both ends of the mobile pole in the facing direction.

In a fifth aspect of the present invention, the base member and the guiding part are integrally formed from a synthetic resin, and the guided part is formed integrally with the mobile pole, by way of the extension of a portion of the mobile pole.

In a sixth aspect of the present invention, one side of the elastic member is coupled to the base member or the fixed pole at multiple locations, and the other side of the elastic member is coupled to the mobile pole in multiple locations.

In a seventh aspect of the present invention, there is a stopper with which the mobile pole makes contact as a result of the biasing force of the elastic member.

In an eighth aspect of the present invention, the mobile pole comprises a part for attachment to the vibrated body.

By virtue of one or more embodiments of the present invention, stable output vibration is produced, even if the ambient temperature changes, and good haptic feedback is produced, because the mobile pole only moves in a prescribed direction.

DETAILED DESCRIPTION OF THE PREFERRED EMBODIMENTS

Hereafter, embodiments of the present invention are described in detail with reference to the drawings, in order to more specifically illustrate the present invention.

First Embodiment

Figure 1:
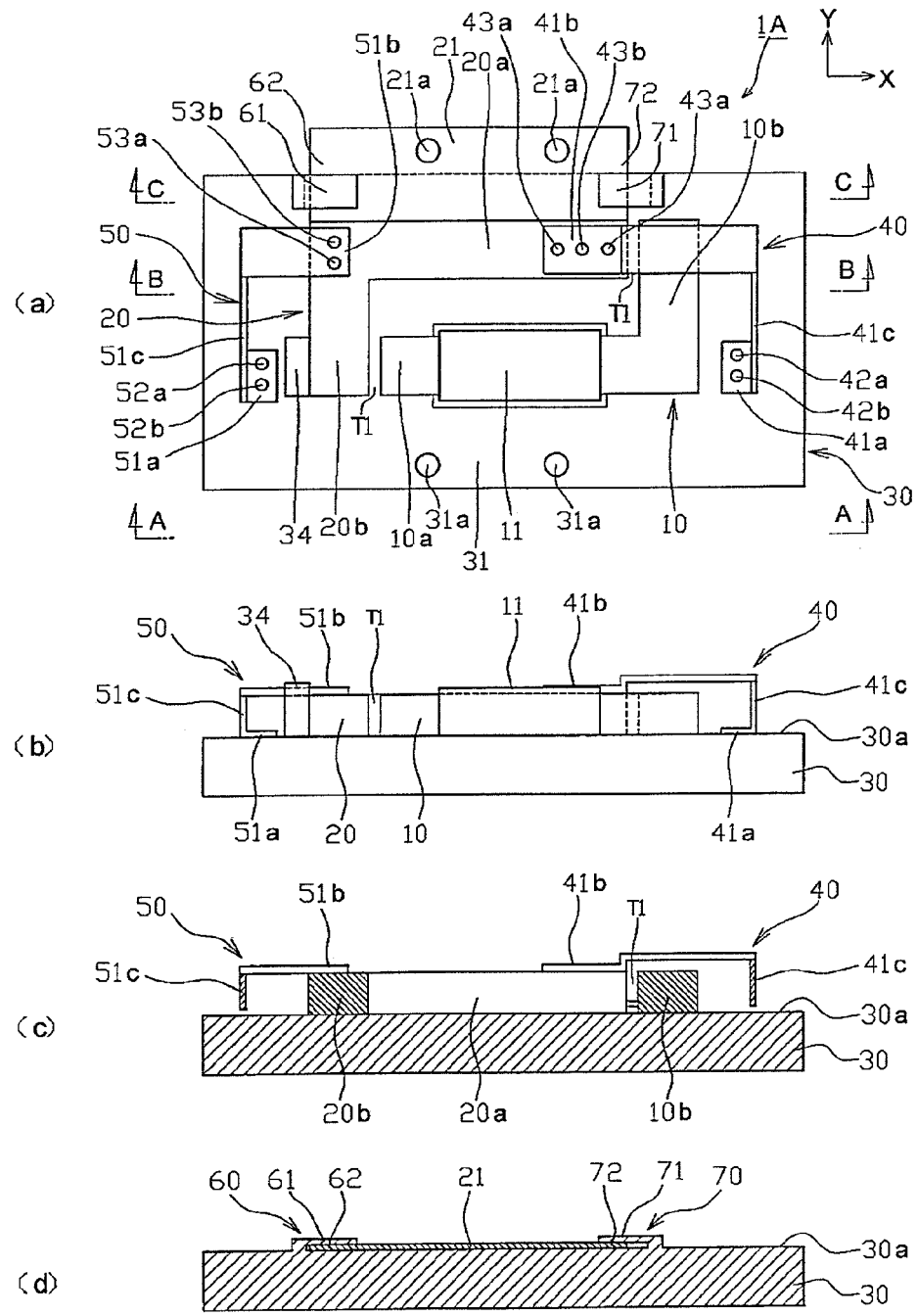
FIG. 1 is a view showing the initial state of a haptic solenoid according to a first embodiment of the present invention; (*a*) is a front view; (*b*) is a view seen from the arrows A-A in (*a*); (*c*) is a sectional view along the section line B-B in (*a*); and (*d*) is a sectional view along the section line C-C in (*a*).
Figure 2:
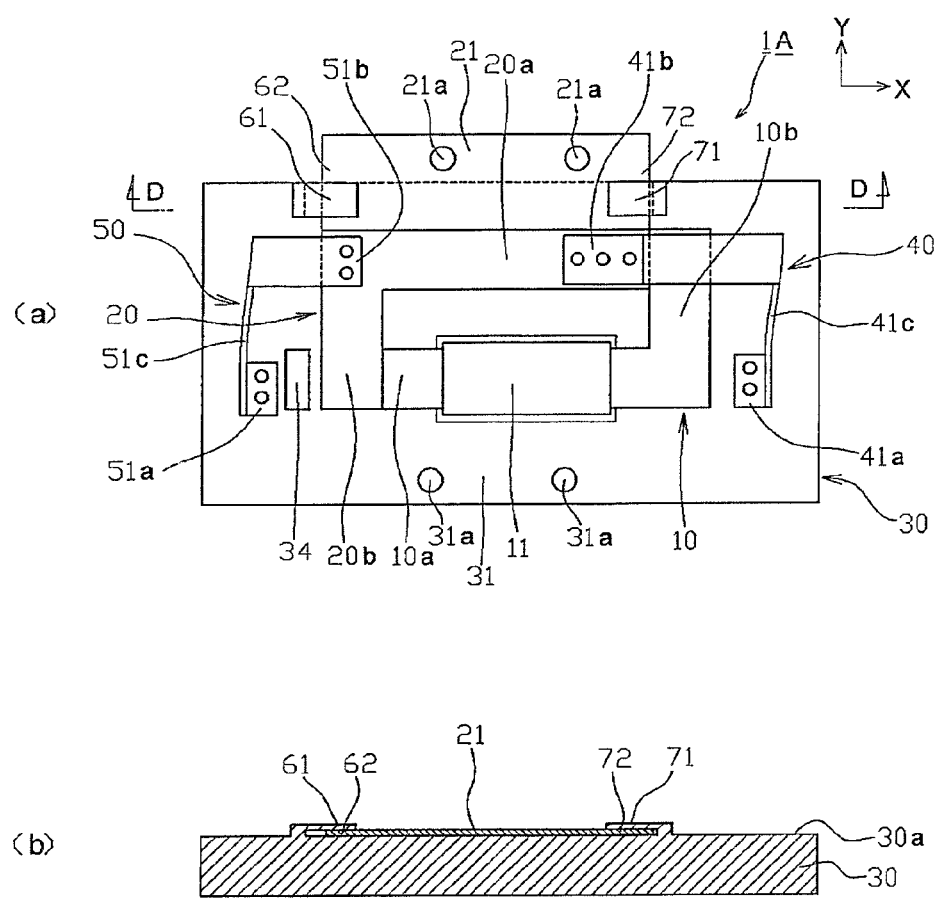
FIG. 2 is a view showing the situation when the haptic solenoid according to the first embodiment of the present invention is operating; (*a*) is a front view; and (*b*) is a sectional view along the section line D-D in (*a*).

A haptic solenoid 1A according to a first embodiment of the present invention is described using FIG. 1 and FIG. 2. The haptic solenoid 1A of this example is used to provide vibration to a vibrated body. The touchscreen frame of an input device mounted in a vehicle or the like can be cited as an example of a vibrated body, but the vibrated body is not limited to this.

The haptic solenoid 1A in this example has a fixed pole 10, a mobile pole 20, a base member 30, two elastic members 40, 50, and two guide mechanisms 60, 70.

The fixed pole 10 is a laminate of plate cores formed in an L shape and having a long leg 10*a* and a short leg 10*b*, which is fixed in place on the base member 30 by way of screws or the like. Furthermore, a coil 11 is wound on the long leg 10a of the fixed pole 10.

The mobile pole 20 moves by way of being magnetically attracted to the fixed pole 10 when power is supplied to the coil 11. This mobile pole 20 is a laminate of plate cores formed in an L shape having a long leg 20a and a short leg 20b, and having the same shape as the fixed pole 10, and is arranged so as to be able to move on the base member 30. In this example, the fixed pole 10 and the mobile pole 20 are arranged in an overall roughly rectangular shape, with the long leg of one facing the short leg of the other in the X direction in FIG. 1 (a), with gaps T1 therebetween.

The bottommost plate core of the mobile pole 20 has a part 21 for attachment to the vibrated body (not illustrated) in a portion that extends upwards. Two mounting holes 21a are provided in the attachment part 21 for screw coupling to the vibrated body. Note that the coupling of the mobile pole 20 and the vibrated body is not limited to screwing, and may also be achieved by fitting mutual recesses and protrusions, bonding and the like.

The base member 30 comprises a plate made from resin, with the fixed pole 10 and the mobile pole 20 arranged on the top face thereof. In the lower central portion thereof, this base member 30 has a part 31 for attachment to a support member (not illustrated) that supports the vibrated body. This attachment part 31 is provided with two mounting holes 31a for screw coupling to the support member. Note that the coupling of the base member 30 and the support member is not limited to screwing, and may also be achieved by fitting mutual recesses and protrusions, bonding and the like.

An elastic member 40 and an elastic member 50 bias the mobile pole 20 in the direction that distances the mobile pole 20 from the fixed pole 10 when power is not supplied to the coil 11 (situation in FIG. 1). Metallic materials having an elastic modulus that does not vary greatly with changes in the ambient temperature can be used as the material for these elastic members 40, 50. Nonmagnetic metallic materials such as, in particular, austenitic stainless steel and aluminum alloys are suitable for these metallic materials.

In this example, the elastic members 40, 50 are constituted by leaf springs. These elastic members 40, 50 comprise fixing parts 41a, 51a for screwing to the base member 30, coupling parts 41b, 51b for screwing to the mobile pole 20, and main leaf-spring bodies 41c, 51c which connect the fixing parts 41a, 51a and the coupling parts 41b, 51b.

A first fitting hole 42a and a threaded hole 42b are provided on the fixing part 41a that is located on one side of the elastic member 40. The first fitting hole 42a fits on a protrusion that is provided on the base member 30. The first threaded hole 42b is screwed together with a coupling hole provided in the base member 30.

Two second fitting holes 43a and one second threaded hole 43b are provided on the coupling part 41b that is located on the other side of the elastic member 40. The second fitting holes 43a fit onto to two protrusions that are provided on the mobile pole 20. The second threaded holes 43b are screwed together with coupling holes provided in the mobile pole 20.

A third fitting hole 52a and a third threaded hole 52b are provided on the fixing part 51a that is located on one side of the elastic member 50. The third fitting hole 52a fits on a protrusion that is provided on the base member 30. The third threaded hole 52b is screwed together with a coupling hole provided in the base member 30.

A fourth fitting hole 53a and a fourth threaded hole 53b are provided in the coupling part 51b located on the other side of the elastic member 50. The fourth fitting hole 53a fits onto a projection provided on the mobile pole 20. The fourth threaded hole 53b is screwed together with a coupling hole provided in the mobile pole 20.

Thus, in this example, one side of each of the elastic members 40, 50 is coupled to the base member 30 in multiple places, and the other side of each of the elastic members 40, 50 is coupled to the mobile pole 20 in multiple places. Note that the one side of each of the elastic members 40, 50 may be coupled to the fixed pole 10 instead of the base member 30. Furthermore the coupling of the elastic member 40 and the base member 30, as well as the coupling of the elastic member 50 and the mobile pole, can be performed in one place with screws alone.

The main leaf-spring body 41c of the elastic member 40 extends in the Y direction, which is orthogonal to the X direction in FIG. 1(a), and can bend in the X direction with the fixing part 41a as a support point. Furthermore, the main leaf-spring body 51c of the elastic member 50 likewise extends in the Y direction and can bend in the X direction with the fixing part 51a as a support point. Consequently, when power is supplied to the coil 11, the mobile pole 20 can be magnetically attracted to the fixed pole 10 and move in the X direction as shown in FIG. 2, and when power is not supplied to the coil, the mobile pole 20 can return to its position in the initial state shown in FIG. 1.

Guide mechanisms 60, 70 guide the motion of the mobile pole 20 so that the mobile pole 20 does not float up from the base member 30 but rather is substantially only able to move in the direction facing the fixed pole 10 (the X direction in FIG. 1(a)). That is to say, the guide mechanisms 60, 70 guide the mobile pole 20 so as to move in the X direction, with the mobile pole 20 in contact with the flat top face 30a of the base member 30.

The guide mechanisms 60, 70 in this example have guiding parts 61, 71, which are provided on the base member 30, and guided parts 62, 72, which engage with the guiding parts 61, 71, and are provided on the mobile pole 20.

In this example, the base member 30 and the guiding parts 61, 71 are integrally formed from synthetic resin and the guided parts 62, 72 are formed integrally with the mobile pole 20. More specifically, in this example, the guiding parts 61, 71 are formed in the shape of an L that projects from the top face 30a of the base member 30, so as to constitute an insertion opening for engaging the guided parts 62, 72. Meanwhile, the guided parts 62, 72 are formed extending from the bottommost plate core comprised as a part of the mobile pole 20, and are arranged at both ends of the mobile pole 20 in the direction in which the fixed pole 10 and the mobile pole 20 face each other (the X direction in FIG. 1(a)).

When the guided parts 62, 72 are inserted into the guiding parts 61, 71, the mobile pole 20 is arranged so as to be able to move within a prescribed range in the X direction in FIG. 1(a), without floating up from the base member 30.

In the haptic solenoid 1A of this example, a stopper 34 constituted by a cuboid standing wall, which is higher than the total height of the mobile pole 20, is provided on the top face 30a of the base member 30. This stopper 34 serves to maintain the gaps T1 between the mobile pole 20 and the fixed pole 10 constant, when power is not supplied to the coil and the mobile pole 20 is distanced from the fixed pole 10 by the biasing force of the elastic members 40, 50.

With the haptic solenoid 1A in this example, which is configured as described above, in the initial state shown in FIG. 1, when power is supplied to the coil 11, the fixed pole 10 serves as an electromagnet, and the mobile pole 20 is magnetically attracted to the fixed pole 10, in opposition to the elastic force of the elastic members 40, 50, and moves in the X direction in FIG. 1(a) so as to strike the fixed pole 10 (see FIG. 2). Then, when power is no longer supplied to the coil 11 and the magnetic attraction ceases, the mobile pole 20 is biased in the direction that distances it from the fixed pole 10 by way of the elastic force of the elastic members 40, 50 and makes contact with the stopper 34, allowing for a return to the initial state shown in FIG. 1.

The haptic solenoid 1A in this example comprises elastic members 50, 60 made from a metallic material, which bias the mobile pole 20 in the direction that distances the mobile pole 20 from the fixed pole 10, when power is not supplied to the coil 11. The elastic modulus of elastic members made from metallic materials of this sort is much less temperature dependent than that of plastic elastic members. Specifically, stainless steel elastic members 50, 60 are used in this example. The variation with temperature of the elastic modulus of these stainless steel elastic members in the temperature range in which haptic solenoids are usually used is approximately one tenth that of thermoplastic resins that are used in plastic frames such as that of the conventional example. Accordingly, the haptic solenoid 1A in this example produces a stable output vibration even if the ambient temperature changes.

As described above, in the present invention, so as to produce a stable output vibration even if the ambient temperature changes, a metallic material is used for the elastic members that has an elastic modulus having low temperature dependency. If this metallic material is magnetic, it may be influenced by the magnetic force of the fixed pole when power is supplied to the coil, and depending on the positional relationship between the elastic members and the fixed pole, this may influence the output vibration. Meanwhile, if a nonmagnetic metallic material is used for the elastic members 40, 50, as in the haptic solenoid 1A of this example, the elastic members will not be influenced by the magnetic force of the magnetized fixed pole, and thus a stable output vibration can be produced regardless of the positional relationship between the elastic members and the fixed pole.

Furthermore, the haptic solenoid 1A in this example is provided with a guide mechanism that guides the movement of the mobile pole so that the mobile pole 20 can only move in the direction facing the fixed pole 10. Consequently, with the haptic solenoid 1A in this example, the direction of vibration of the mobile pole 20 is stable and the prescribed level of vibration can be stably produced, allowing for good haptic feedback.

Furthermore, with the haptic solenoid 1A in this example, one end of each of the elastic members 40, 50 is directly coupled to the mobile pole 20, so that a more compact haptic solenoid is achieved, without the elastic members being unduly large.

Furthermore, with the haptic solenoid 1A in this example, the top face 30a of the base member 30 is in a plane parallel to the direction in which the mobile pole 20 and the fixed pole 10 face each other (the X direction in FIG. 1(a)), and the guide mechanisms 60, 70 are configured to guide the mobile pole 20 so that the mobile pole 20 moves in contact with the top face 30a. Consequently, with the haptic solenoid 1A in this example, vibration that is out of the plane of the base member 30 is suppressed, and thus the vibration of the mobile pole 20 can be efficiently transmitted to the vibrated body.

Furthermore, with the haptic solenoid 1A in this example, the guide mechanisms comprise guiding parts provided on the base member and guided parts provided on the mobile pole, which engage with the guiding parts. Next, the guided parts 62, 72 are provided at the both ends in the direction in which the mobile pole 20 and the fixed pole 10 face each other. Consequently, with the haptic solenoid 1A in this example, the mobile pole 20 can reliably move on the base member without floating up from the base member 30, allowing the vibration of the mobile pole to be very efficiently transmitted to the vibrated body.

Furthermore, with the haptic solenoid 1A in this example, the base member 30 and the guiding parts 61, 71 are integrally formed from synthetic resin, and the guided parts 62, 72 are formed integrally with the mobile pole 20, by way of the extension of a portion of the mobile pole 20. Consequently, a haptic solenoid can be realized with which stable output vibration is produced with few parts.

With a haptic solenoid such as that in this example, with the mobile pole pressing against the fixed pole when power is not supplied to the coil, vibration will not be produced because the mobile pole cannot move, and if the mobile pole is excessively distanced from the fixed pole when power is not supplied to the coil, the prescribed vibratory force will not be produced. Consequently, it is important that this be assembled so that the gaps (T1 in FIG. 1) between the fixed pole and the mobile pole are precisely maintained.

Thus, in the haptic solenoid 1A of this example, the elastic members 40, 50 are each coupled to the mobile pole 20 and the base member 30 in multiple locations.

For example, for the elastic member 40, the first fitting hole 42a in the fixing part 41a and the second fitting hole 43a in the coupling part 41b fit with protrusions provided respectively on the base member 30 and the mobile pole 20, so as to position the elastic member 40 without producing unwanted deformation. In this state, the first threaded hole 42b in the fixing part 41a and the second threaded hole 43b in the coupling part 41b are screwed together with the coupling holes respectively provided in the base member 30 and the mobile pole 20.

By coupling the elastic members 40, 50 to the mobile pole 20 and the base member 30 so that unwanted deformation of the elastic members 40, 50 does not occur in this manner, assembly is possible with an accurately uniform gap T1 between the fixed pole and the mobile pole, allowing a highly reliable haptic solenoid to be realized, in which there is little variation in the level of vibration between products.

Furthermore, in the haptic solenoid of this example, a stopper 34 is provided, which makes contact with the mobile pole 20 by way of the biasing force of the elastic members 40, 50. Consequently, even after long durations, the gap T1 between the mobile pole 20 and the fixed pole 10 when power is not supplied to the coil can be maintained constant, so that a stable output vibration is produced over long periods of time.

Furthermore, in the haptic solenoid 1A of this example, a part 21 for attachment to the vibrated body is provided on the mobile pole 20 itself. Consequently, the vibration of the mobile pole can be very efficiently transmitted to the vibrated body.

Second Embodiment

Figure 3:
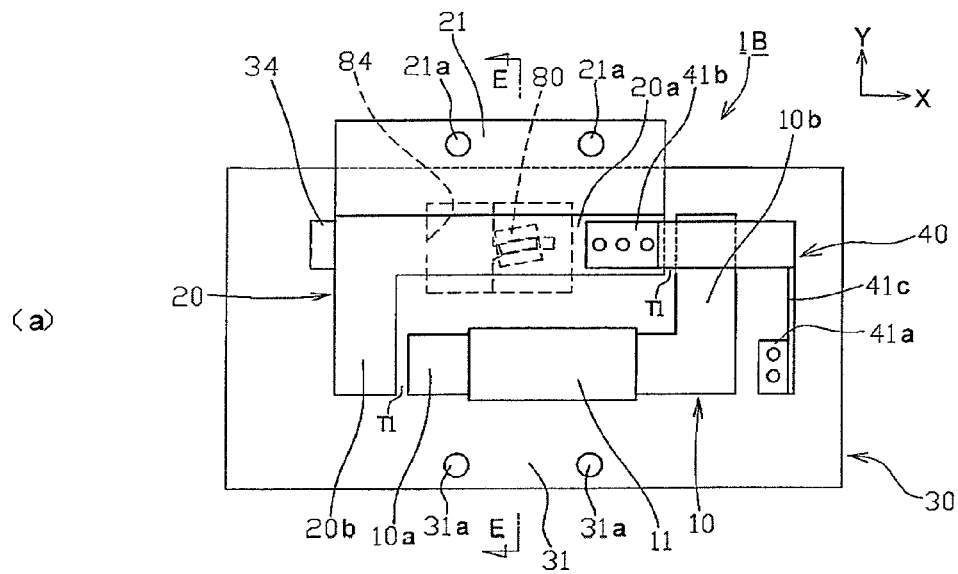
FIG. 3 is a view showing the initial state of a haptic solenoid according to a second embodiment of the present invention; (*a*) is a front view; (*b*) is a view seen from the arrows E-E in (*a*); and (*c*) is an enlarged view of a guide mechanism 80 seen from the back.
Figure 3:
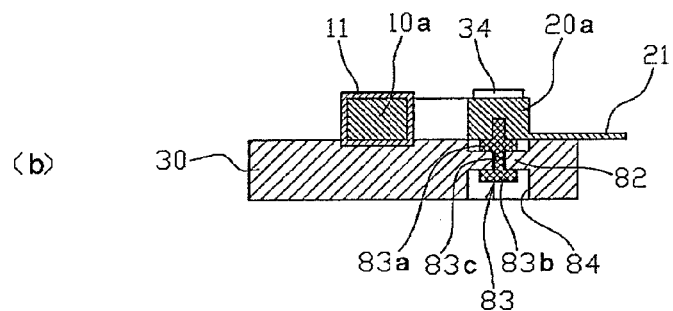
Figure 3:
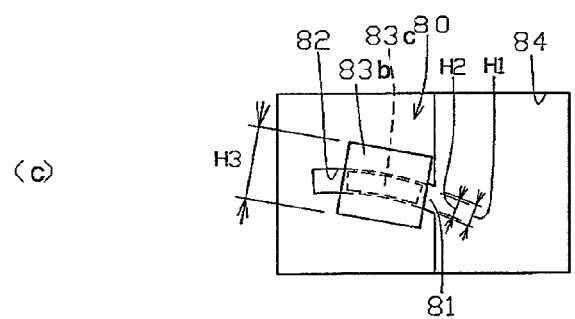

A haptic solenoid 1B according to a second embodiment of the present invention will be described using FIG. 3. In FIG. 3, reference numerals that are the same as those in FIG. 1 or FIG. 2 indicate equivalent parts and a detailed description thereof is omitted.

In the haptic solenoid 1B of this example, there is only one elastic member and a guide mechanism is used which is different from that in the first mode of embodiment. The guide mechanism 80 in this example has a guiding part 81 consisting of a slot provided in the base member 30 and a guided part 83, which is provided on the mobile pole 20.

The longitudinal direction of the guiding part 81 is approximately the same as the direction in which the mobile pole 20 and the fixed pole 10 face each other (the X direction in FIG. 3(*a*)). One end of the guiding part 81 communicates with an insertion hole 84 that is provided in the base member 30 for inserting the guided part 83. This insertion hole 84 is formed a larger than the external dimensions of the guided part 83.

Furthermore, the guiding part 81 is formed as an arc corresponding to the displacement of the main leaf-spring body 41*c* of the elastic member 40. That is to say, it is formed as an arcuate slot corresponding to the displacement when the main leaf-spring body 41*c* is displaced in an arc around the fixing part 41*a*, corresponding to the vibration of the mobile pole 20.

The guided part 83 has an upper flange 83*a*, a lower flange 83*b* and a joining part 83*c* that joins the upper flange 83*a* and the lower flange 83*b*, and is united with the bottom face of the long leg 20*a* of the mobile pole 20, by way of press fitting. The sectional shape of the joining part 83*c* is formed as an arc corresponding to the guiding part 81.

The width H1 of the slotted guiding part 81 in the crosswise direction is slightly larger than the width H2 of the joining part 83*c* in the crosswise direction, and smaller than the width H3 of the lower flange 83*b*. Furthermore, the thickness of the longitudinal lateral edge 82 of the guiding part 81 is slightly smaller than the gap between the upper flange 83*a* and the lower flange 83*b*. Next, the guided part 83 is inserted into the insertion hole 84 and engaged so that the joining part 83*c* slides in the guiding part 81, whereby the mobile pole 20 can substantially only move in the direction facing the fixed pole 10 (the X direction in FIG. 3(*a*)).

With the haptic solenoid 1B in this example, which is configured as described above, in the initial state shown in FIG. 3, when power is supplied to the coil 11, the fixed pole 10 serves as an electromagnet, and the mobile pole 20 is magnetically attracted to the fixed pole 10, in opposition to the elastic force of the leaf spring, and moves in the X direction in FIG. 3(*a*) so as to strike the fixed pole 10. Then, when power is no longer supplied to the coil and the magnetic attraction ceases, the mobile pole 20 is biased in the direction that distances it from the fixed pole 10 by way of the elastic force of the elastic members 40, and makes contact with the stopper 34, allowing for a return to the initial state shown in FIG. 3.

The haptic solenoid 1B in this example has the same operative effect as the haptic solenoid 1A in the first embodiment, and allows minimal gaps to be established between the guiding part 81 and the guided part 83, even though the mobile pole 20 moves in an arc, so that the mobile pole can move smoothly and the vibration of the mobile pole can be efficiently transmitted to the vibrated body.

Third Embodiment

Figure 4:
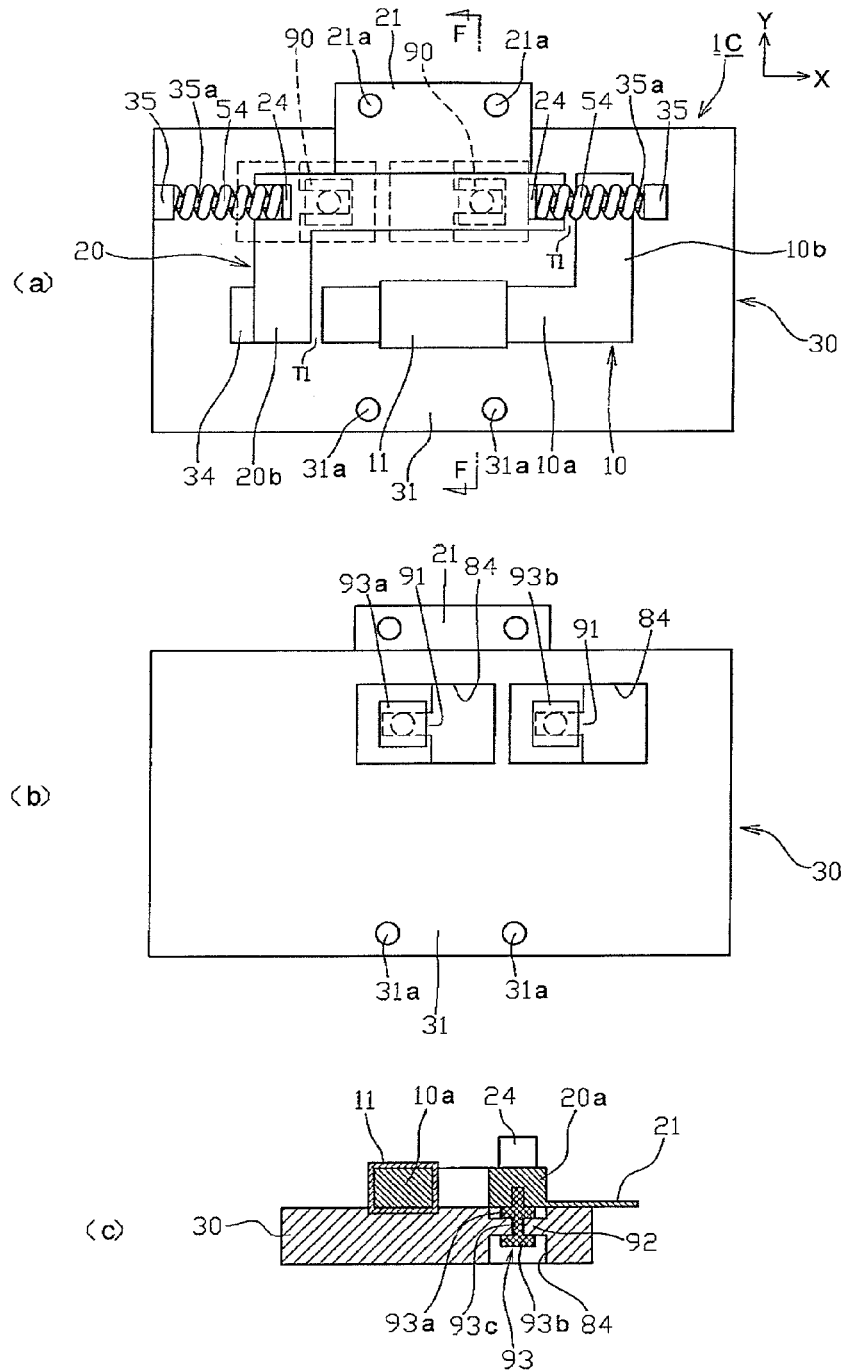
FIG. 4 is a view showing the initial state of a haptic solenoid according to a third embodiment of the present invention; (*a*) is a front view; (*b*) is a back view; and (*c*) is a sectional view along the section line F-F in (*a*).
Figure 5:
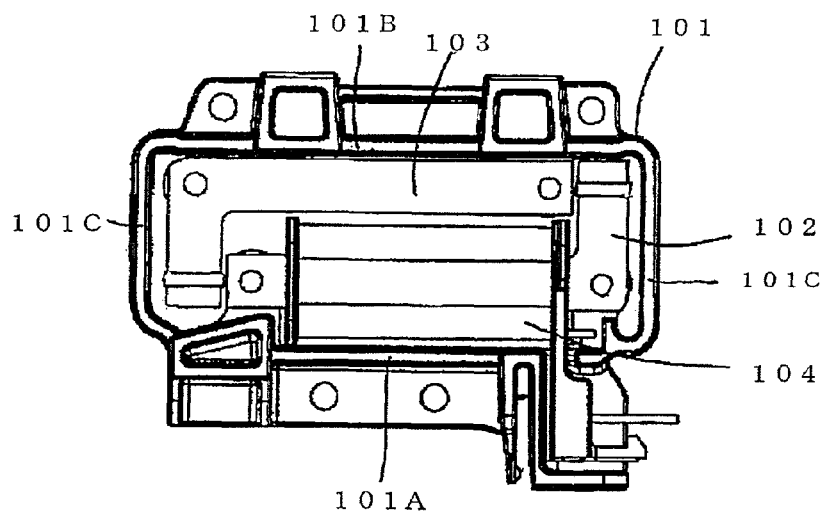
FIG. 5 is a drawing describing a prior art haptic solenoid.

A haptic solenoid 10 according to a third embodiment of the present invention will be described using FIG. 4. In FIG. 4, reference numerals that are the same as those in FIG. 1 to FIG. 3 indicate equivalent parts and a detailed description thereof is omitted.

The elastic members in the first and second embodiments are leaf springs, but the elastic member in this example is constituted by a cylindrical metal compression coil spring. In this example, a cuboid standing wall 35 that is higher than the overall height of the mobile pole 20 is formed on the top face 30*a* of the base member, and the coil spring 54 is supported by inserting a protrusion 35*a* that is provided on this standing wall 35. Furthermore, one side of the coil spring 54 is coupled to the standing wall 35, and the other side of the coil spring 54 is coupled to a standing wall 24 that is formed united with the mobile pole 20.

Furthermore, in the second embodiment, there was one guide mechanism 80, but in this example, there are two guide mechanisms 90. Furthermore, in the second embodiment, the sectional shape of the joining part 83*c* in the guided part 83 was such that this was formed as an arc, but in this example the sectional shape of the joining part 93*c* in the guided part 93 is circular. Furthermore, in the second embodiment, the guiding part 81 was arcuate, but in this example the guiding part 91 is a straight slot that is formed so that the longitudinal direction coincides with the direction in which the mobile pole 20 and the fixed pole 10 face each other, and two guiding parts 91 are provided in the base member 30. Note that the longitudinal direction of the guiding parts 91 is the same as the direction of elastic deformation of the coil spring 54.

Next, the guided parts 93 are inserted into the insertion holes 84 and engaged so that the two joining parts 93*c* slide in the two guiding parts 91, whereby the mobile pole 20 can only move in the direction facing the fixed pole 10 (the X direction in FIG. 4(*a*)).

With the haptic solenoid 10 in this example, which is configured as described above, in the initial state shown in FIG. 4, when power is supplied to the coil, the fixed pole 10 serves as an electromagnet, and the mobile pole 20 is magnetically attracted to the fixed pole 10, in opposition to the elastic force of the coil spring 54, and moves in the X direction in FIG. 4(*a*) so as to strike the fixed pole 10. Then, when power is no longer supplied to the coil and the magnetic attraction ceases, the mobile pole 20 is biased in the direction that distances it from the fixed pole 10 by way of the elastic force of the coil spring 54, allowing for a return to the initial state shown in FIG. 4. Consequently, in contrast with the second mode of embodiment, in this example, the mobile pole can move in a rectilinear (one-dimensional) manner, allowing the vibration of the mobile pole to be very effectively transmitted to the vibrated body.

Three embodiments of the present invention have been described above, but the present invention is not limited to these embodiments, and these embodiments can be suitably varied within the scope that does not the part from the gist of the present invention.

Specifically, for example, the coil spring serving as the elastic member in the third embodiment is coupled to the base member, but rather than the base member, this may be coupled to the fixed pole. In this case, a standing wall, which is not illustrated, is formed united with the fixed pole for supporting the coil spring and, with a protrusion provided on this standing wall inserted into the coil spring, the coil spring is coupled to the standing wall on the fixed pole and the standing wall 24 on the mobile pole. With such a configuration as well, the same effect is produced as in the third embodiment.

Furthermore, in the second and third embodiments, the guide mechanisms are not limited to a slotted guiding part provided in the base member 30 and a guided part provided on the mobile pole 20. The arrangement of the guiding part and the guided part may be reversed so that the guide mechanism has a slotted guiding part provided in the mobile pole 20 and a guided part provided on the base member 30.

Furthermore, in terms of the combination of the mobile pole 20 and the fixed pole 30 described above, other modes are also possible so long as the mobile pole 20 can move as a result of being magnetically attracted towards the fixed pole 30 when power is supplied to the coil. For example, the combination of the mobile pole and the fixed pole may be a C-shaped fixed pole on which a coil is wound, and an I-shaped mobile pole that is arranged in the vicinity of the ends of the magnetic legs of this fixed pole, or an E-shaped fixed pole wherein a coil is wound on the central leg, and an I-shaped mobile pole that is arranged in the vicinity of the ends of the magnetic legs of this fixed pole.

Furthermore, the present invention can also be configured in a mode wherein the guide mechanism of the second mode of embodiment is added to the first embodiment.

What is claimed is:

1. A haptic solenoid used for providing vibration to a vibrated body comprising:
    a base member having a flat upper surface;
    a fixed pole which is fixed in place on the flat upper surface of said base member and on which a coil is wound;
    a mobile pole, which is arranged on the flat upper surface of said base member facing said fixed pole with a gap therebetween and which moves by way of being magnetically attracted to said fixed pole when power is supplied to said coil;
    an elastic member which biases said mobile pole in a direction that distances said mobile pole from said fixed pole when power is not supplied to said coil;
    a guide mechanism which guides the movement of said mobile pole,
    wherein said elastic member is made from a metallic material, and said guide mechanism guides the movement of said mobile pole so that said mobile pole can only move in a direction facing said fixed pole with said mobile pole in contact with the flat upper surface of said base member.

2. The haptic solenoid according to claim 1, wherein said elastic member is made from a nonmagnetic metallic material.

3. The haptic solenoid according to claim 1, wherein said guide mechanism comprises a guiding part provided on said base member and a guided part which engages with said guiding part and which is provided on said mobile pole.

4. The haptic solenoid according to claim 3, wherein said guided part is provided at both ends of said mobile pole in said facing direction.

5. The haptic solenoid according to claim 3, wherein said base member and said guiding part are integrally formed from a synthetic resin, and said guided part is formed integrally with said mobile pole by way of the extension of a portion of said mobile pole.

6. The haptic solenoid according to claim 1, wherein one side of said elastic member is coupled to said base member or said fixed pole at multiple locations, and the other side of said elastic member is coupled to said mobile pole in multiple locations.

7. The haptic solenoid according to claim 1, comprising a stopper with which said mobile pole makes contact as a result of the biasing force of said elastic member.

8. The haptic solenoid according to claim 1, wherein said mobile pole comprises a part for attachment to said vibrated body.

* * * * *